United States Patent
Locher et al.

(10) Patent No.: US 8,438,952 B2
(45) Date of Patent: May 14, 2013

(54) CUT AND STRIP MACHINE FOR PRODUCING CABLE-SECTIONS

(75) Inventors: Beat Locher, Spiez (CH); Reto Appenzeller, Uetendorf (CH)

(73) Assignee: Schleuniger Holding AG, Thun (CH)

( * ) Notice: Subject to any disclaimer, the term of this patent is extended or adjusted under 35 U.S.C. 154(b) by 205 days.

(21) Appl. No.: 13/126,744

(22) PCT Filed: Nov. 2, 2009

(86) PCT No.: PCT/IB2009/054854
§ 371 (c)(1),
(2), (4) Date: Apr. 28, 2011

(87) PCT Pub. No.: WO2010/061303
PCT Pub. Date: Jun. 3, 2010

(65) Prior Publication Data
US 2011/0219927 A1 Sep. 15, 2011

Related U.S. Application Data

(60) Provisional application No. 61/111,332, filed on Nov. 4, 2008.

(30) Foreign Application Priority Data

Nov. 3, 2008 (CH) .................................. 01722/08

(51) Int. Cl.
*H02G 1/12* (2006.01)
*B23P 23/00* (2006.01)

(52) U.S. Cl.
USPC .......................................... 81/9.51; 29/564.4

(58) Field of Classification Search ............. 81/9.4, 81/9.51, 9.41–9.44; 29/564.4, 33 F, 33 M
See application file for complete search history.

(56) References Cited

U.S. PATENT DOCUMENTS

| 3,309,948 A | 3/1967 | Falken |
| 5,010,797 A | 4/1991 | Stepan |

(Continued)

FOREIGN PATENT DOCUMENTS

| DE | 20314835 U1 | 4/2004 |
| EP | 240836 A2 | 10/1987 |

(Continued)

OTHER PUBLICATIONS

PCT International Search Report and Written Opinion of ISA, from parent PCT/IB2009/054854 of the present application; dated Oct. 6, 2010.

(Continued)

*Primary Examiner* — David B Thomas
(74) *Attorney, Agent, or Firm* — George Kapsalas; Patentbuero Paul Rosenich AG

(57) ABSTRACT

A cut and strip machine (1) for producing cable-sections by processing a passing cable, especially coaxial or optical cable (2). Cable-sections are cut off from the cable, and on both ends of each cable-section at least one insulating layer can be notched/cut and stripped off. The machine comprises at least one cable feeding device (3, 4), and a cable processing unit, preferably cutting unit (6) arranged adjustably transverse to a cable axis, as well as a first cable guiding unit arranged—in a feeding direction (5) of the cable (2)—in front of said cable processing unit (6). A second cable guiding unit is arranged behind said cable processing unit (6). These first and second cable guiding units may be formed as fixed, non-rotating first and second cable centering units (7, 8). These are arranged in the immediate vicinity of the cable processing unit (6), and are suitable for centering, preferably straight-line centering, of the cable (2) on both its sides. At least one of the cable centering units (8) can be adjusted transversely to the cable axis for effecting its adjustment to the current diameter of the cable to be processed.

19 Claims, 4 Drawing Sheets

U.S. PATENT DOCUMENTS

| | | |
|---|---|---|
| 5,243,882 A | 9/1993 | Stepan |
| 5,320,002 A | 6/1994 | Sayyadi et al. |
| 5,361,384 A | 11/1994 | Stepan |
| 5,950,505 A | 9/1999 | Locher |
| 6,910,256 B2 | 6/2005 | Locher et al. |
| 7,257,878 B2 | 8/2007 | Locher et al. |
| 2005/0211025 A1 | 9/2005 | Steuri et al. |
| 2009/0126181 A1 | 5/2009 | Locher et al. |

FOREIGN PATENT DOCUMENTS

| | | |
|---|---|---|
| EP | 297484 A1 | 1/1989 |
| EP | 240836 A3 | 2/1989 |
| EP | 715384 A2 | 6/1996 |
| EP | 715384 A3 | 3/1997 |
| EP | 1079478 A1 | 2/2001 |
| EP | 860044 B1 | 7/2003 |
| EP | 1667296 A2 | 6/2006 |
| EP | 1667296 A3 | 4/2007 |
| WO | 95/32535 A1 | 11/1995 |
| WO | 97/17751 A1 | 5/1997 |
| WO | 98/13907 A1 | 4/1998 |
| WO | 03/100935 A1 | 12/2003 |
| WO | 2005/046015 A1 | 5/2005 |

OTHER PUBLICATIONS

ISR of Swiss(CH) Patent Office in Priority Application No. CH01722/08, dated Feb. 17, 2009.

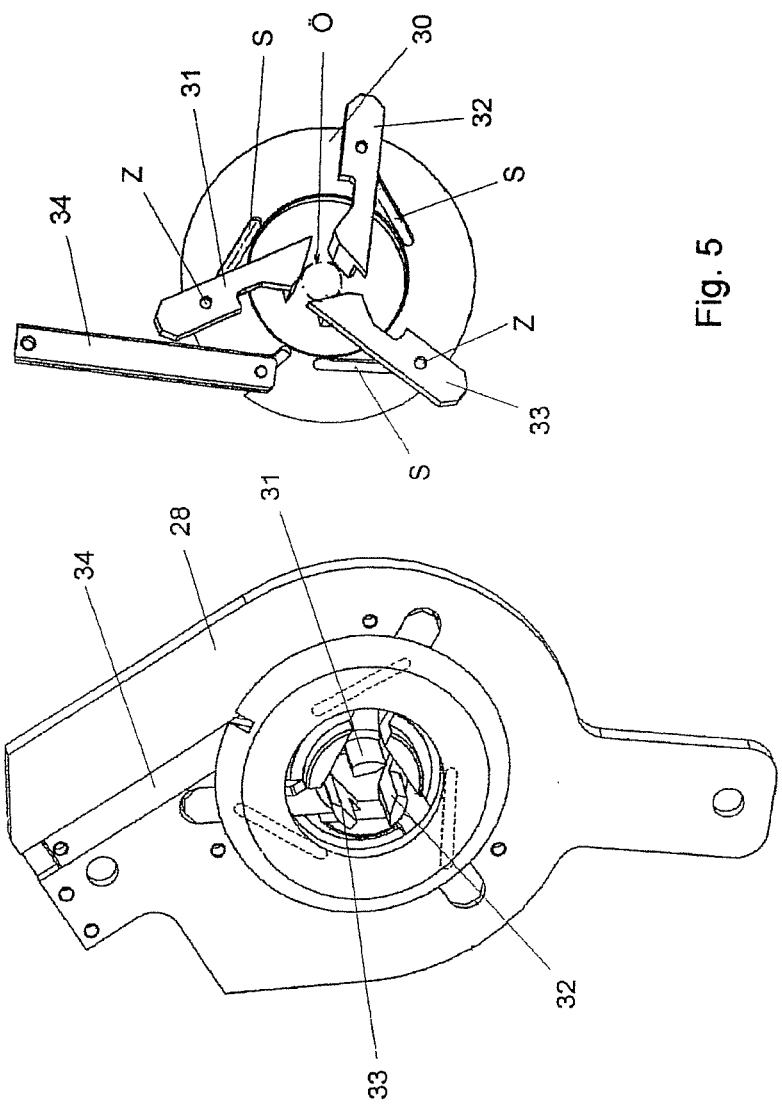

CUT AND STRIP MACHINE FOR PRODUCING CABLE-SECTIONS

This application is a 35 U.S.C. 371 national stage entry of PCT International App. No. PCT/IB2009/054854 filed on Nov. 2, 2009 and published as WO2010/061303A2 on Jun. 3, 2010, claiming benefit of foreign priority to Swiss national app. no. CH1722/2008 filed on Nov. 3, 2008, and also claiming benefit of domestic priority to U.S. provisional app. No. 61/111,332 filed on Nov. 4, 2008; the entireties of both Swiss application no. CH1722/2008 and U.S. provisional application No. 61/111,332 are hereby expressly incorporated herein by reference, for all intents and purposes as if they were fully stated herein.

FIELD OF THE INVENTION

This invention relates generally to a cut and strip machine for producing wire or cable or wire sections, by means of which an "endless" cable, for example a coaxial or optical cable can be processed, wherein cable-sections can be cut off and then, at least one insulating layer can be notched or cut and, in a given case, stripped off on both ends of each cable-section.

PRIOR ART

From EP-0860044B1 a cable processing apparatus is known, which comprises a tool support for holding a pair of blades, and a tool support feeding means for lateral positioning the tools. In front of the pair of blades, the passing cable is led through a short first guide sleeve, and in a given case, through a second guide sleeve, arranged behind the pair of blades for possibly alignment of the cable end before the cutting and stripping steps, and during its feeding to the blades by a first cable feeding device and behind the blades to a second cable feeding device.

But, such a cable guiding, especially the use of said second guiding sleeve is problematic in the practice, especially due to the fact that after the stripping steps one or more layer/s the cable ends have different external diameters to be guided. On the other hand, due to its given flexibility or bending strength, the cable usually cannot be guided properly, that is, perpendicular to a cutting plane. That is why the cutting areas may have a poor quality.

Especially at processing of the coaxial cables or optical cables (light wave guiding cables) different coatings, such as external covering, aramid reinforcement, primary and secondary coatings, etc. are to be stripped step-by-step on each of the single- or multi-mode cables being on the market (about 100 different cable types), for which high processing quality and high productivity would be needed in practice, preferably without frequent change of the blades or tools.

DE-U-20314835 discloses an apparatus for stripping a cable end, wherein first concentric and longitudinal cuttings are prepared in the insulation of a conductor in order to remove coating by sections. This apparatus comprises a housing, clamping jaws for fixing (clamping) the cable end to be processed, and a rotary cutting head having at least one knife, wherein the position of the rotary cutting head can be adjusted in relation to the cable isolation. Furthermore, the rotary cutting head is provided with an adjusting device for its axial adjustment. A similar cable stripping apparatus is known from WO03/100935A. But, it is to be noted that the above mentioned machines are not suitable for processing of passing "endless" cable, that is, for automatic production of wire- or cable-sections with stripped cable ends.

SUMMARY OF THE INVENTION

An object of the present invention is to provide an improved solution, by means of which the above mentioned drawbacks of the prior art could be eliminated or at least reduced, that is, by means of which cable-sections can be produced automatically, and with higher precision and higher quality by processing of passing cables, especially coaxial cables or optical cables.

This object is completely achieved by the solution having the features disclosed and described below. Preferable improvements of the invention are also disclosed in the detailed description.

According to the invention, the traditional first and second cable guiding units are substituted according to the invention by fix first and second cable centering units, respectively, which are suitable for centering the cable or the cable-section on its both sides. On the other hand, at least the second cable centering unit can be adjusted transversally, e.g. radially to the cable axis for its adjustment to the current diameter of the cable or cable-section to be processed. By this centering step on both sides of the cable or the cable-section, really a finely centered position of the cable or the cable-section can be reached. Furthermore, according to the invention the cable or the cable-section can be even straight-line centered accurately by the proposed cable centering units. As a consequence, an exactly perpendicular cutting step can be performed. On the other hand, any bending of the cable-section or any uncontrollable geometry of the cutting surfaces can be eliminated.

The cable centering units according to the invention are preferably designed in such a way that they are suitable for accurate centering of the cable-section on its both sides in its centered position, but the centering units can additionally be suitable for a predetermined clamping of the cable or the cable-section on its both sides, too. This clamping step is preferably carried out in such a way that the employed clamping force is distributed along possibly the whole periphery of the cable, as uniformly as possible. Thereby the proper torque can be produced for preventing any rotation or twist of the cable to be processed. In this case, a predetermined minimum clamping force can be used, which leads to the advantage that the cable is not crushed on its one side at all, or it is not squeezed. This careful processing is especially advantageous for the newest coaxial cable designs (spongy dielectric, so-called "low-loss cable"), and this advantage has not been reached with the known processes or machines yet. Besides, it is made sure by this centering on both sides according to the invention that the cable cannot reel. By means of the suggested cable centering units there is achieved, according to our experiments, that—due to the centering effect according to the invention—the cable is orientated in a such a manner that during its processing any cable rotation or twist can be satisfactorily excluded by applying the lightest possible surface pressure (on both sides) due to the predetermined light clamping of the cable on both sides. As a consequence, the processing quality has become surprisingly high.

By elimination of any wobbling of the cable, the frictional forces between the knife and the cable can be reduced, so that the cutting forces are smaller, thereby smaller cables can be processed than before, trouble-free.

In a preferred embodiment of the invention, the centering effect and the predetermined clamping effect on both sides of the cable are carried out by the same units or elements, e.g.

centering jaws. In an alternative embodiment of the invention, the fixed (non-rotating) accurately-working cable centering device is arranged on both sides directly next to the rotary cutting device, and an additional cable clamping device may be provided, which is arranged outside the cable centering device. But, by the combination of both functions "centering" and "light clamping" of the cable in the preferred embodiment, a structurally simple mechanism is proposed by the present invention. However, this solution offers an essential advantage, that is, to prevent the rotation or twist of the cable in the close vicinity of processing site; it means that practically any twist of the cable can be excluded.

The adjustable centering jaws of the centering units can be carried out in different designs, and they can be actuated for example by means of a motor or pneumatic working cylinder through (or without) a friction clutch. In operation, it is advantageous when the clamping force can be adjusted very precisely.

BRIEF DESCRIPTION OF THE DRAWINGS

The most important advantages and further details, features and objects of the invention will become more apparent from the detailed description of the preferred embodiments below, with reference to the accompanying drawings, in which:

FIG. 4 shows a specific example of the cable centering unit of FIG. 2, enlarged;

FIG. 5 shows an essential part of FIG. 4, wherein centering jaws are in closed working position;

DETAILED DESCRIPTION OF PREFERRED EMBODIMENTS

Figure 1:
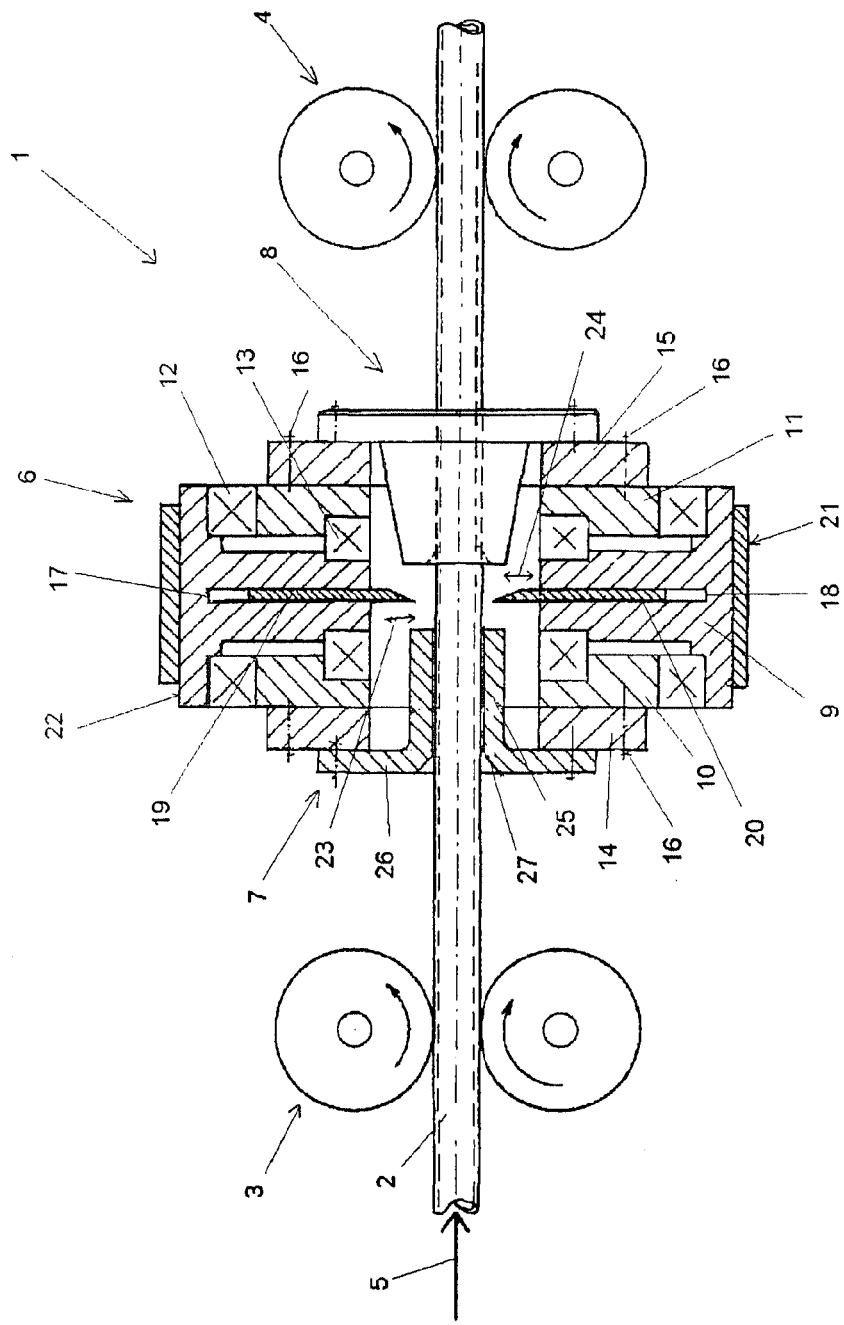
FIG. 1 shows a schematic cross-sectional view of a first embodiment of the cut and strip machine for producing cable-sections according to the invention.
Figure 3:
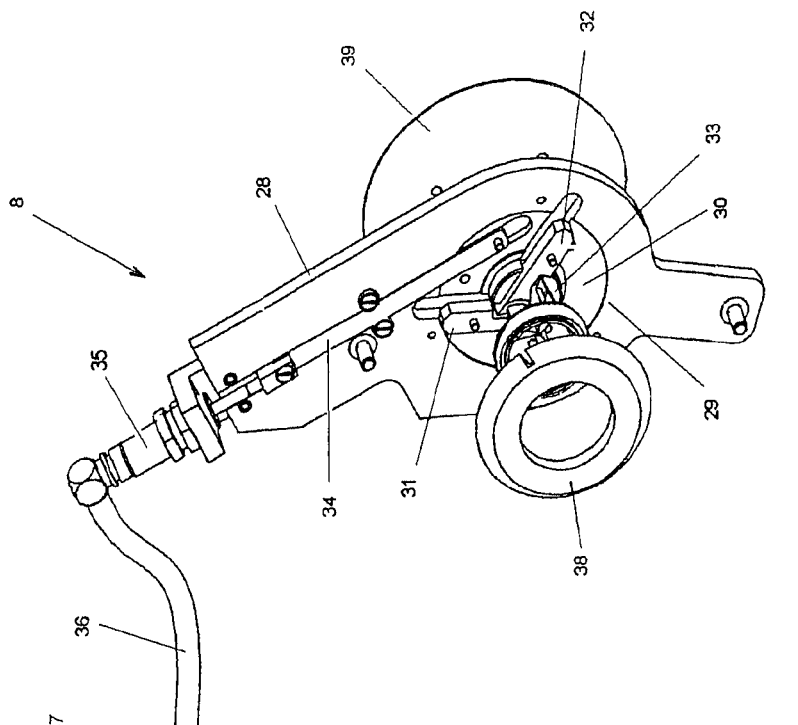
FIG. 3 illustrates a disintegrated perspective view of the second cable centering unit of FIG. 2.
Figure 2:
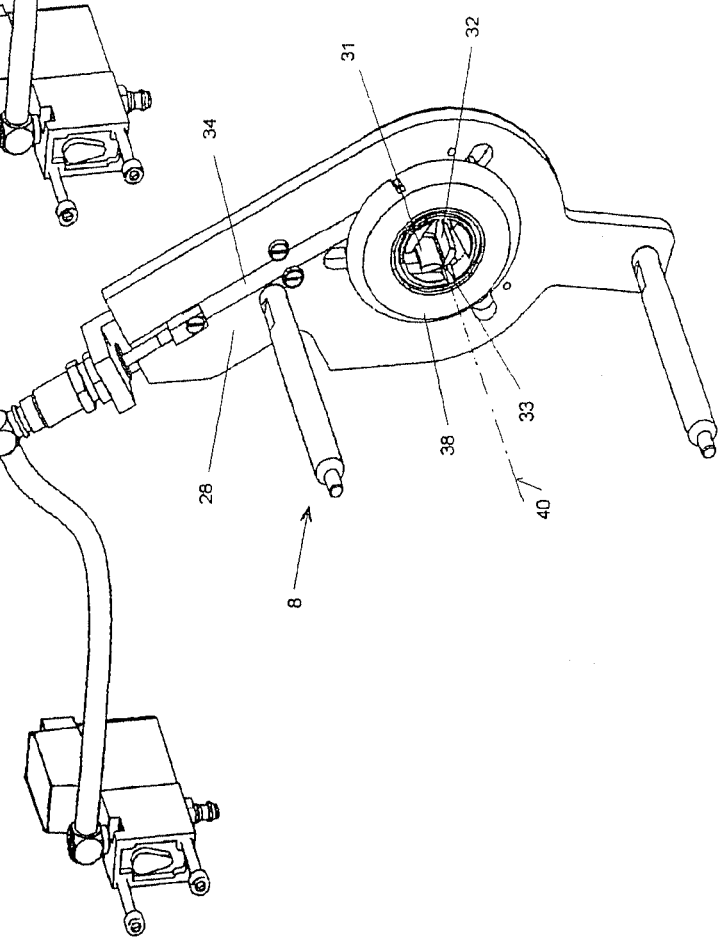
FIG. 2 shows a perspective view of an essential part, that is, a second cable centering unit of the machine of FIG. 1.

FIG. 1 shows a schematic illustration of essential elements of a first embodiment of a cut and strip machine 1 for producing cable-sections according to the invention, which elements are most important for explanation of the invention. This cut and strip machine 1 is suitable for producing wire- or cable-sections from a passing cable 2, e.g. coaxial cable, or optical cable coil, wherein cable-sections can be cut off from the cable 2, one after the other, and on both ends of each cable-section at least one coating, e.g. an insulating layer can be notched or cut and then, stripped off, if needed.

The cable 2 to be processed can be pulled off from a storage drum (not illustrated) in a known manner. The cut and strip machine 1 is provided with at least one cable feeding device; in the illustrated embodiment of FIG. 1, the machine 1 comprises two cable feeding devices 3 and 4, respectively, which are formed in this case as driven pair of rollers being arranged at a distance from each other along an axis of the cable 2 (similarly like in the above cited EP-0860044B1). A feeding direction of the cable 2 is indicated by an arrow 5 in FIG. 1. The cable feeding devices 3 and 4 are designed for axial transport of the cable 2 and, on the other hand, for axial clamping thereof.

The machine 1 for producing cable-sections has a cable processing unit being adjustable in cross direction to the axis of the cable 2, especially a cutter device 6, as well as in front of the cutter device 6—viewing in the feeding direction (arrow 5) of the cable 2—a first cable guiding unit and second cable guiding unit behind the cutter device 6. According to the invention the first and the second cable guiding units are designed as fixed (non-rotating) cable centering units 7 and 8, respectively, and at least one of said cable centering units 7 and 8, preferably the second cable centering unit 8 can be adjusted perpendicular to the axis of the cable 2 in order to be able to follow precisely the different cable diameters to be processed.

In a preferred embodiment, both of the cable centering units 7 and 8 are adjustable cross (transverse) to the cable axis, according to the current diameter of the cable 2, or in each position of the cable or wire.

In contrast with the relatively simple function of the cable guiding unit (sleeve) in the prior art, which tried to provide possibly alignment of the cable or wire during processing, the cable centering units 7 and 8 according to the invention have a complex function: to provide a precise centering on both sides of the cable 2 or cable-section (in this case without any clamping the cable), and to adjust themselves precisely to the different cable diameters to be processed during this cable centering step, too.

It is to be stressed out first that said "centering jaws" according to the invention have quite another task than the "clamping or fixing jaws" in the prior art. The centering jaws according to the invention are, first of all, designed for centering the cable-section on both sides, but primarily not for axial clamping or fixing the cable to be processed. This is basically performed by the cable feeding devices, which should orientate the cable in axial direction.

In the example shown in FIG. 1, the processing unit, especially cutting unit 6 is implemented as rotary cutting head (rotativbox). This rotary cutting unit 6 comprises a rotor disc 9 which is rotatably embedded on both sides in bearings 12 and 13, respectively, being arranged in a first support disc 10 and a second support disc 11, respectively. The support discs 10 and 11 are fixed, in the present case, by means of screws 16 to a first bracket 14 and a second bracket 15, respectively. These brackets 14 and 15 are fastened to a framework (not illustrated) of the machine 1.

In this version, the rotor disc 9 is provided with two radial slots 17 and 18, respectively, which are formed opposite to each other, and in each of said radial slots 17 and 18 a cutting element 19 and 20, respectively, is radially adjustably arranged. These cutting elements 19 and 20 are in co-operation with each other in the sense of cutting the cable, and therefore each of the cutting elements 19 and 20 is provided at its external end with an actuating device, for example a controlled pneumatic actuating cylinder or electrical adjusting means (not illustrated). The rotor disc 9 is connected to a rotary drive 21, e.g. a toothed V-belt drive, from which in FIG. 1 only its toothed belt can be seen, which is in a driving connection with an external mantle surface 22 of the rotor disc 9. In FIG. 1, the radial movement directions of said cutting elements 19 and 20 are indicated by arrows 23 and 24, respectively.

As to the number of the used blades or blade elements as cutting elements, there are no restrictions in the different embodiments of the invention. But, the employment of two blades or blade elements is preferred, especially when they are arranged opposite to each other. These two blades, in combination with said first cable centering unit (in front of the cutting unit) and said second cable centering unit (behind the cutting unit) being arranged in an immediate vicinity to the cutting elements, allow an optimal rotary cutting under the possible lowest load (stress) of the cable. The cutting edge of the knife, which comes in frictional connection with the face surfaces of the cable during the cutting step, is proportional with a friction force exercised by the blades on the cable. The smaller this friction force, the less is the torque exercised on the cable, and that is why a smaller centering force and clamping force can be adjusted at the given device. This is especially advantageous when thin cables or cables with a relatively thick isolation layer are to be processed.

As mentioned above, said first and second cable centering units 7 and 8, respectively, are fixed, that is, non-rotating means. They are arranged coaxially with the processing unit, e.g. rotary cutting unit 6 along the axis of the endless cable 2 (see FIG. 1).

The first cable centering unit 7 comprises an interchangeable cylindrical sleeve 25 in FIG. 1, which is provided with a flange 26 connecting said sleeve 25 to the bracket 14. For a fine centering effect an internal diameter of the sleeve 25 is to be chosen in such a way that the clamping effect of the cable in the given case should be eliminated or prevented. The first cable centering unit 7 is provided with an inlet funnel 27 for an undisturbed introduction of the cable end. As shown in FIG. 1, the rear end of the first cable centering unit 7 is arranged in the closest possible position compared to a cutting plane of the cutting elements 19 and 20.

According to the invention, at least the second cable centering unit 8 is cross to the cable axis adjustably designed in such a way, to permit an exact and non-rotary centering of the cable 2 or the cable section, as well as, to permit its fine adjustment to the respective cable diameter. The first version of the second cable centering unit 8 is illustrated in details in FIGS. 2-5.

The second cable centering unit 8 is formed in FIGS. 2-5 as a fixed centering head (in a given case it can be designed as a supplementary/auxiliary device, too) with a flat housing 28, in which a round notch is formed for accommodation of a control disc 30. In this embodiment, said control disc 30 comprises three, essentially radial moveable centering jaws 31, 32, and 33 for centering the respective cables 2, for what the control disc 30 can be turned in the notch 29 by a push rod 34 in a predetermined degree. The push rod 34 is connected herewith actuating means, e.g. a pneumatic working cylinder 35 for operating said push rod 34, and thereby for a predetermined radial setting or adjustment of the cable centering jaws 31-33. The working cylinder 35 is connected through a pressure hose 36 with a magnet valve 37. This working cylinder 35 has a flat form and can easily provide the necessary actuating force, without any problems. The whole construction according to the invention, together with the push rod, is also very flat and needs a few movable parts only. The notch 29 of the housing 28 is closed at both its ends with covers 38 and 39, respectively.

A common axis 40 of the centering jaws 31-33 (FIG. 2) and that of a centering opening for the cable are arranged coaxially with the cable axis (see FIG. 1) in the built-in state of the second cable centering unit 8. On the other hand, it is shown in FIG. 1, that the front end of the second cable centering unit 8 is also arranged as near as possible to the cutting plane of the cutting elements 19 and 20.

In operation, by the straight (substantially tangential) movement of the push rod 34 the control disc 30 will be relatively rotated within the notch 29, and thereby the radial movements (inwards or outwards) of the centering jaws 31-33 are triggered. In this mechanism, e.g. control grooves S can be used in co-operation with pins Z (see FIG. 5). These details, or other radial adjustable devices, however, must be known or obvious for a person having ordinary skill in the art, on the basis of the present disclosure.

When the centering jaws 31-33 are moved substantially in radial direction inwardly or outwardly by means of the working cylinder 35 through the push rod 34 and the control disc 30, they border a predetermined centering opening Ö for the respective cable 2 (FIG. 5). The second cable centering unit 8 is provided therefore preferably with three radial (or otherwise) adjustable centering elements, namely preferably said centering jaws 31-33, that are mutually displaced, one to another, by about 120°, and by means of which the cable centering opening Ö receiving the cable 2, can be opened or closed in a predetermined degree—preferably like an "iris diaphragm"—, depending on the actual diameter of the processed cable 2. The second cable centering unit 8 is secured against rotation, as mentioned above, however it is designed in such a way, that the centering jaws 31-33 are extended into the internal space of the processing unit 6 to have a position directly next to the rotating cutting elements 19 and 20 (see FIG. 1).

Said fixed second cable centering unit 8 has the special task, also to center and to support the possibly free cable end. This enables a more precise, rotary notching/cutting step of the cable coating or one of its insulation layers to a later stripping the isolation section, or for the axial retaining of the isolation sections, or for cutting off the cable 2.

As shown in FIGS. 2-5, the second cable centering unit 8 is a very flat device in its completed form, and ready for operation for itself, which can be used according to the invention as additional/auxiliary device to subsequent installation, or it can be designed as a unit which can be tilted in and out. It needs only a comparatively small space for installation. This is especially advantageous because, thereby, the space between the cutting head and the cable feeding devices is not too narrow, so it can be held relatively small. Consequently the total length of the machine can be reduced, and as well the feeding axial force can act nearly at the blades. This again serves the higher precision of the processing because thereby at drawing-off any possible extension of the cable can be reduced to a minimum.

Figure 6:
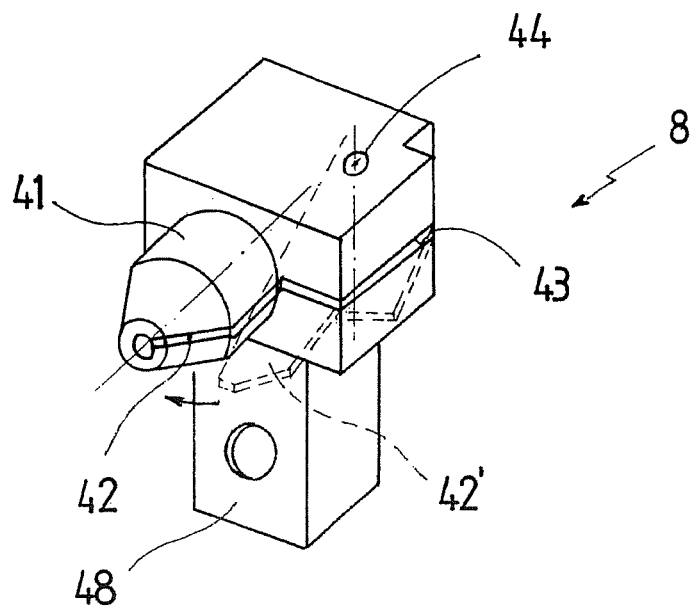
FIG. 6 shows a perspective view of a second embodiment of the second cable centering unit according to the invention.
Figure 7:
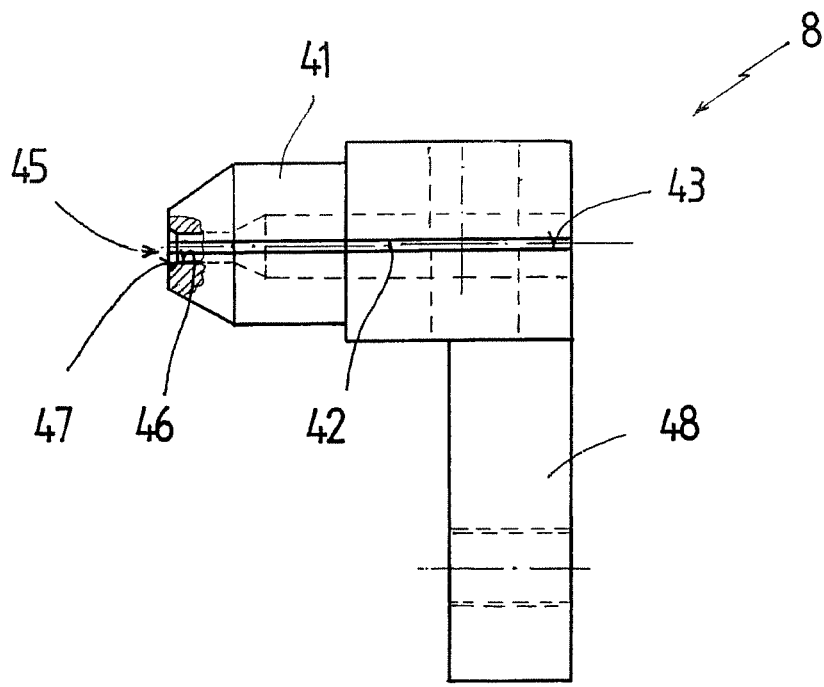
FIG. 7 shows a side view of the second cable centering unit of FIG. 6, partly broken out.

A simplified embodiment of the cable centering unit 8 according to the invention is illustrated in FIGS. 6 and 7. This fix cable centering unit 8 has a centering sleeve 41 with a radial adjustable centering latch 42, which can be rotated in a radial recess 43 of the centering sleeve 41 around a fulcrum 44 (centre of rotation). In FIG. 6, the open position of the centering latch was designated with broken lines and reference number 42'. The fine setting of the centering latch 42 in radial direction for centering the cable can be accurately controlled, e.g. by means of a pneumatic working cylinder (not shown), depending on the cable diameter to be processed.

In this version, a centering opening 45 is formed on the one hand by a through hole 46 of the centering sleeve 41, on the other hand, by a predetermined actual radial position of the centering latch 42. The hole 46 is provided with an inlet horn 47 for introducing the cable end (FIG. 7). The second cable centering unit 8 comprises a support element 48 by means of which it can be fastened coaxially, for example to the fixed bracket 15 of the rotary cutting unit 6 (see FIG. 1).

The fixed first and second cable centering units 7 and 8 can also be designed in a given case so that they are suitable for centering of the cable 2 on both sides, and they are suitable additionally also for a predetermined light clamping of the cable 2 or the cable section at least in a degree to eliminate any rotation or twist of the cable. But, by the combination of both functions "centering" and "light clamping" of the cable 2, a structurally very simple mechanism is proposed by the present invention. However, this solution offers an essential advantage, that is, to prevent any rotation or twist of the cable 2 in the close vicinity of processing unit, it means, that any twisting of the cable 2 can practically be excluded (e.g. in the cutting step).

This simple embodiment of the second cable centering unit 8 is especially suitable for centering predetermined cable diameters. So this construction is preferred in particular for those machines, in which cables having different diameters are to be processed only seldom, so that this second cable centering unit need not be changed frequently.

In a most preferred embodiment of the machine 1 according to the invention, the first cable centering unit 7 has the same design as the second centering unit 8 according to FIGS. 2 and 3 or FIGS. 4 and 5, or in combination thereof. By this means a fine and accurate centering of the cables 2 can be adjusted, and as a result, a higher quality of cable processing can be reached.

According to our tests with the prototype of the machine 1 according to the invention, we can establish, that by using the proposed fine centering the cable on both sides, the different cable processing methods could be carried out without any change of blades or tools; an "endless" cable, especially a coaxial cable, can be processed in a simple manner, with a surprisingly high quality, wherein a cable-section can be cut off, and on both ends of the cable-section at least one insulating layer can be notched and stripped off.

As to the operation of the above embodiments of the machine 1 according to the invention, we also refer to the disclosure of the above cited EP-0860044B1. The high processing quality and the high productivity of the cut and strip machine 1 according to the invention guarantee at the same time the high rentability of this machine 1.

Of course, the present invention is not limited to the embodiments discussed above; smaller improvements, modifications and combinations of the features of the invention, or their combinations with the above cited EP-0860044B1 or WO2005046015A also fall within the scope of protection determined by the attached claims. The embodiments of the invention shall be clear for a person having ordinary skill in the art on the basis of the above disclosure.

LIST OF REFERENCE CHARACTERS 1 cut and strip machine
2 cable
3 first cable feeding device
4 second cable feeding device
5 arrow (feeding direction of cable 2)
6 processing unit/cutting unit
7 first cable centering unit
8 second cable centering unit
9 rotor disc
10 first support disc
11 second support disc
12 bearing
13 bearing
14 first bracket
15 second bracket
16 screw
17 slot
18 slot
19 first cutting element
20 second cutting element
21 rotary drive (toothed V-belt drive)
22 external mantle surface
23 arrow (direction of movement for the first cutting element 19)
24 arrow (direction of movement for the second cutting element 20)
25 sleeve
26 flange
27 inlet funnel
28 housing
29 notch
30 control disc
31 first centering jaw
32 second centering jaw
33 third centering jaw
34 push rod
35 working cylinder
36 pressure hose
37 magnet valve
38 cover
39 cover
40 axis of a centering opening (and the centering jaws 31-33)
41 centering sleeve
42 centering latch
43 recess
44 centre of rotation (fulcrum)
45 centering opening
46 hole
47 inlet horn
48 support element
S control groove
Z pin
Ö centering opening

What is claimed is:

1. A cable cut and strip machine comprising:
a pair of cable feeding rollers;
a first cable centering unit configured to receive cable from said pair of cable feeding rollers;
a rotary cutting head configured to receive cable from said first cable guide;
said rotary cutting head including a rotor disc;
bearings rotatably supporting said cutting head;
said rotor disc having a plurality of radial slots;
a plurality of respective cutting blades in said plurality of radial slots;
a second cable centering unit disposed on a side of said rotary cutting head that is opposite to said first cable centering unit;
said second cable centering unit including a housing;
a notch formed in said housing;
a control disc configured to turn in said notch;
a push rod operatively connected to said control disc;
a plurality of control grooves in said control disc;
a plurality of radially moveable jaws configured to be actuated by respective control grooves; and,
a plurality of respective pins each extending from a respective radially moveable jaw into a respective control groove.

2. A cable cut and strip machine as claimed in claim 1, further comprising:
a second pair of cable feeding rollers disposed on said same side of said rotary cutting head as said second cable centering unit.

3. A cable cut and strip machine as claimed in claim 1, further comprising:
an external mantle surface on said rotor disc; and,
a rotary drive in driving connection with said mantle surface.

4. A cable cut and strip machine as claimed in claim 1, further comprising:
   support discs receiving said bearings.
5. A cable cut and strip machine as claimed in claim 1, further comprising:
   a first cover covering said control disc and said plurality of radially moveable jaws.
6. A cable cut and strip machine as claimed in claim 5, further comprising:
   a second cover covering said notch at one of its ends.
7. A cable cut and strip machine as claimed in claim 1, further comprising:
   a working cylinder connected to said housing and to said push rod, said working cylinder configured to actuate said push rod and turn said control disc.
8. A cable cut and strip machine as claimed in claim 1, further comprising:
   a pressure hose connected to said working cylinder.
9. A cable cut and strip machine as claimed in claim 1, further comprising:
   a valve connected to said pressure hose.
10. The cable cut and strip machine as claimed in claim 1, wherein:
    said first cable centering unit has a cylindrical sleeve.
11. A cable cut and strip machine as claimed in claim 1, further comprising:
    a flange connected to said cylindrical sleeve.
12. A cable cut and strip machine as claimed in claim 1, further comprising:
    said first cable centering unit includes a first housing;
    a first notch formed in said housing;
    a first control disc configured to turn in said first notch;
    a first push rod operatively connected to said first control disc;
    a plurality of first control grooves in said control disc;
    a plurality of radially moveable first jaws configured to be actuated by respective first control grooves; and,
    a plurality of respective first pins each extending from a respective radially moveable first jaw into a respective first control groove.
13. A cable centering unit comprising:
    a housing;
    a notch formed in said housing;
    a control disc configured to turn in said notch;
    a push rod operatively connected to said control disc;
    a plurality of control grooves in said control disc;
    a plurality of radially moveable jaws configured to be actuated by respective control grooves;
    a plurality of respective pins each extending from a respective radially moveable jaw into a respective control groove; and,
    a working cylinder connected to said housing and to said push rod, said working cylinder configured to actuate said push rod and turn said control disc.
14. A cable centering unit as claimed in claim 13, further comprising:
    a first cover covering said control disc and said plurality of radially moveable jaws.
15. A cable centering unit as claimed in claim 13, further comprising:
    a second cover covering said notch at one of its ends.
16. A cable centering unit as claimed in claim 13, further comprising:
    a pressure hose connected to said working cylinder.
17. A cable centering unit as claimed in claim 13, further comprising:
    a valve connected to said pressure hose.
18. A cable centering unit comprising:
    a centering sleeve;
    a hole extending through said centering sleeve;
    a radial recess in said centering sleeve; and,
    a radial centering latch configured for radial positioning in said radial recess.
19. A cable centering unit as claimed in claim 18, further comprising:
    a fulcrum through said radial centering latch.

* * * * *